Figure 1:
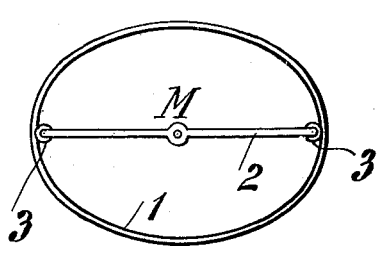

June 15, 1937.  A. J. ZÁRUBA  2,084,116
RESILIENT CONSTRUCTIONAL ELEMENT
Filed April 15, 1933  3 Sheets-Sheet 1

June 15, 1937.  A. J. ZÁRUBA  2,084,116
RESILIENT CONSTRUCTIONAL ELEMENT
Filed April 15, 1933  3 Sheets-Sheet 2

June 15, 1937.  A. J. ZÁRUBA  2,084,116
RESILIENT CONSTRUCTIONAL ELEMENT
Filed April 15, 1933  3 Sheets-Sheet 3
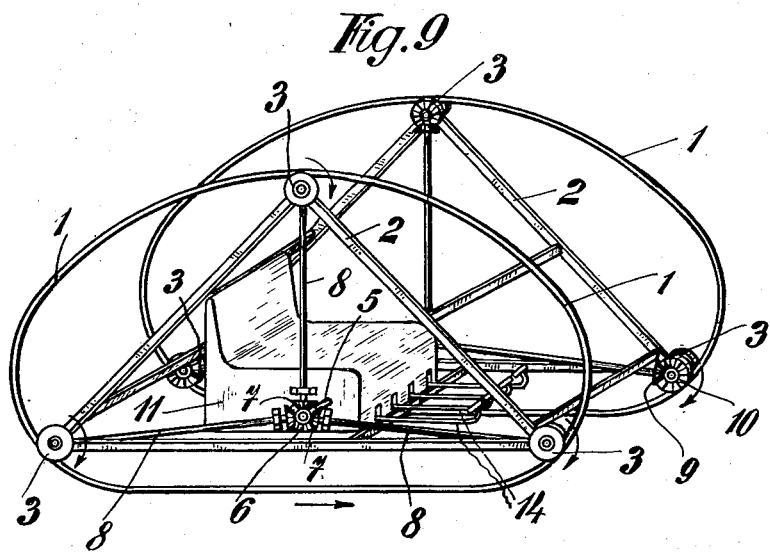
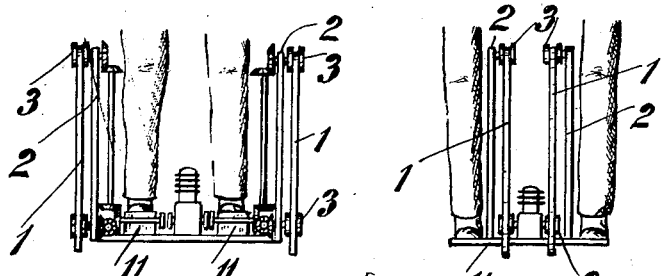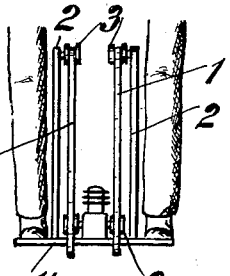
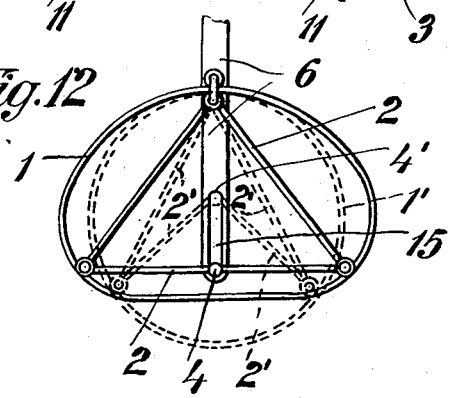

Patented June 15, 1937

2,084,116

UNITED STATES PATENT OFFICE 2,084,116

RESILIENT CONSTRUCTIONAL ELEMENT

Antonin Jan Záruba, Vienna, Austria

Application April 15, 1933, Serial No. 666,360
In Austria April 20, 1932

21 Claims. (Cl. 74—55)

The invention concerns the creation of a new universal machine-element, which is intended to be a universal mediatorial connecting organ between various possible external means, powers and motions which are to be operatively interconnected by this new constructional element for the purpose of translating, conveying, converting and suitably transmitting power and motion from one external means to others, which are operatively interconnected by this universal transmission element. This element, which constitutes an individual system, comprises in combination three essential parts in mutual structural relationship: namely hoop, rolling and stay parts. The resilient hoop is adapted to be bent in operative connection with other means situated on its circumference, the stays carry and maintain at a suitable mutual distance apart the rollers, which are adapted to move along on and relatively towards and from the circumference of the hoop and are arranged between the hoop and the stays. The said essential component parts in the internal structural relationship of this system are in a mutually movable and rotatable relationship and always operatively influenced by the resilient resistance of the resiliently bent parts of this system, and in external structural relationship they are operatively influenced by the external driving, driven or relatively stationary means which are interconnected by this machine-element. In this manner, according to the structural law disclosed any power and motion may be conveyed, converted or suitably transmitted from one external means to others which are operatively interconnected with the aid of the said machine-element; this always in accordance to which of the essential component parts are actually permanently or temporarily connected or in connection with an external means, power or motion. Each of the three essential component parts of this elementary system can, during the transmission of power or motion which may be imparted to or derived from any of the component parts of this system, be the active, initiative or relatively passive part relatively to the other parts of the system, or it may be the first or the last in the structural sequence of the transmitting action in the system. Each of the component parts can be the part which is permanently or temporarily connected with other technical elements or means, as circumstances may require, and according to which of the essential component parts is connected with the driving external means or part. The component parts can operate in the unit of the system in relation to various timed operative sequences according to the relative mutually changing movable positions and to the succession of action. This transmission element enables also an inversion of the operation, f. i. relatively to the driven and driving means and transmitted or converted power and motion. All the various possible employments, functions and effects are manageable with the same new basic structural law acting in the unit of the individual elementary system of this new constructional element. Thus, this new universal machine-element, in its full technical proper meaning, is really suitable and advantageous for various technical uses and purposes and can, in its specific mode of action and effect, take the place of known universal machine-elements (f. i. the "lever" or its higher two-dimensional potence, the "wheel" and others) not only as regards many of their modes of employment and known technical relations with other means, but this new machine-element on account of its higher-grade and greater capabilities can also bring about technical relations and effects of such a kind and manner, for which other known constructional elements are incapable, as some following examples of use and the illustrations given for the purpose of examination and comparison will prove. For this reason this invention discloses a new universal machine-element.

Figs. 1-15 of the accompanying drawings show some examples of this new constructional element and also some examples of its various possible uses. The essential component parts of this machine-element are designated as follows in all the figures of the drawings:—part 1 is the resilient hoop, part 2 the stays and part 3 the rolling parts between the hoop and stays. Some general properties of the essential component parts of this constructional element are hereinafter first described in detail, with reference to the various uses and functions of the element.

The resilient hoop can be made of any resilient elastic material, such as steel, rubber or rubber derivatives and the like. It may be solid or composed of parts, arranged in bundles as a plait, rope, or spiral, and also of combinations of different resilient and elastic materials. It may further be of any cross sectional shape for example round, polygonal or strip-shaped; and also broad or narrow and the like. The surface of the hoop may be smooth or prepared in different ways, provided with projections and depressions or with layers or coating of other material. The terms ellipse, ring, oval and the like are here identical as used for the hoop; in unloaded condition it is a ring, when loaded it is an oval, ellipse or any other shape different from the circular one.

The supporting stays or the frame, composed there of (part 2), according to their actual purpose of use, may be of different shapes or material in all possible combinations. The frame is either rigid, or the stays of which it is composed are rigidly connected or adapted to be taken to pieces or foldable. The stays may be rigid, flexible, of resilient material, or provided with hinges. (Stays with variable mutual distance of their ends with the rolling parts thereon are shown for example in the dotted lines in Figs. 2 and 6.)

The rolling parts, situated between the stays and the hoop, such as rollers, cylinders, wheels and the like (part 3), may vary in shape, number and mutual spacing, corresponding to the cross section and the material of the other component parts of the element and to the requirements of the actual use and service and to the type of the drive. The hoop, the stays and the rolling parts between them form together an individual elementary system constituting the machine element.

When the stays or the supporting frame are arranged rotatable around an axle, this latter need not necessarily be in the centre of the circular or oval hoop or in the point of intersection of the two main axes of an ellipse, but, as complicated transmissions of movement and power may demand, for example in the case of use in packing machines, mixing or kneading machines and the like, it may be in one of the focuses of the ellipse, or in a position other than the centre of the rotary hoop. A shaft connected with the rotary system usually stands perpendicularly to the plane of the resilient hoop, this may however, be out of the vertical, as far as, for example, the circular section or the dimension of the hoop allow. Other shapes of paths of movement are obtained if the resilient ellipse is rigidly or pivotally connected at a point of its circumference with a relatively stationary external means (see f. i. Fig. 14). The centre of the major and the minor axes of the ellipse must be f. i. hingedly connected with a driving shaft as the centre of the two axes continually changes its position (f. i. oval path). The ends of the stays in the position of the two main axes move on a lath deviating from a circle (see Fig. 14a). Also for flying machines with flapping or oscillating wings i. e. the type which alone enables sharp veering, slow flight and stopping in the air, the resilient constructional element and its combinations may be an important constructional assistance for the movement of the planes (an example for an elastically moving plane see f. i. in the Fig. 15). For moving means or systems, such as aeroplane wings, propellers, windwheels or the like resiliently elastically moved in the highly compressible and elastic air, with the aid of the new machine-element, will much more effectively adapt itself to the great complex of invisible aerodynamic forces in their numerous combinations than a rigid system. The differences in density of the air, changing considerably locally and temporally, require constant elastic accommodation. Consequently the resilient constructional element will considerably reduce the possibility of fracture when an aeroplane propeller or a ship's screw connected with such an element strikes into sudden differences of density, as it is elastically joined with the driving parts. The resilient constructional element has not a rigid, unchangeable shape, but becomes rigid or yields as required like a muscle and possesses a permanent accumulated working capacity in its tension. The transmission of the power, (elementary, vital forces or motor forces of any kind), upon or from any parts of the elementary system is effected either direct or by any known intermediate elements or means, variable or invariable, or by changing the rolling parts on the resilient hoop. This may be managed either automatically or by hand or foot (f. i. by means of lever, cam, flexible cable or the like). For increasing the friction between the hoop and the parts rolling thereon, a fluting or a favourable coating may be provided, if it is necessary. Further, the rolling parts are adapted to the shape, dimensions, profile and material of the hoop for reliable guiding and influencing the same (f. i. by flanges, etc.) and also additional guiding rollers, wheels and the like can be arranged internally or externally situated. For the stationary fixation of the rolling parts on the supporting hoop in the case of using this constructional element f. i. in vehicles, a locking mechanism may also be provided, which is operatable automatically or at will. This constructional element is beneath others rotary around a centre inside or outside the system rotating on the same place or rotary translating from place. The system may be also at a point of one of its component parts fixed on a relatively stationary place and stays can be arranged acting in or also out of the plane or the range of the hoop. The united system can be permanently or variably operatively engaged, with other technical elements or means. Two or more constructional elements may be also operatively so connected, that one of the essential component parts is common to more than one element. It is further possible to arrange this machine-element not only singly, but also in plurality in the same plane or in different planes or positions and according to their object and operation the elements contact, intersect or be mutual interconnected by intermediate members or means.

The Figs. 1-15 of the accompanying drawings shown several examples of the connections and the relations between the component parts of the system and also some examples of use and function of this new machine-element operatively connecting various means, powers and motions, always in accordance to the basic structural law disclosed. These but few examples are given for the better comprehension of the character and nature of this new machine-element, the connections and relations can suitably be also others than those shown by way of example.

Figure 2:
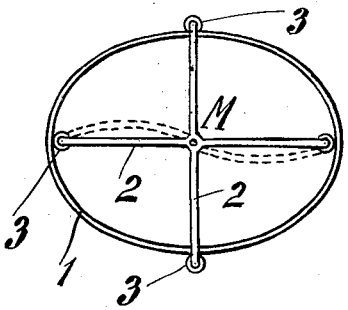
Figure 3:
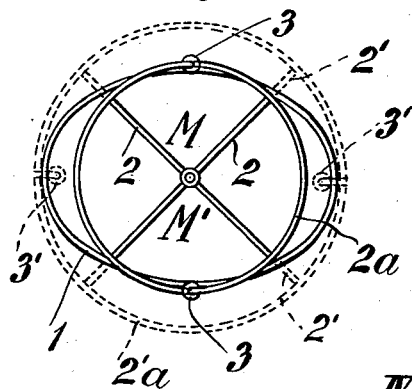
Figure 4:
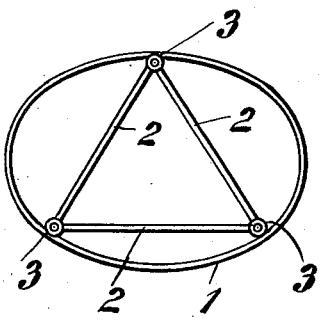
Figure 5:
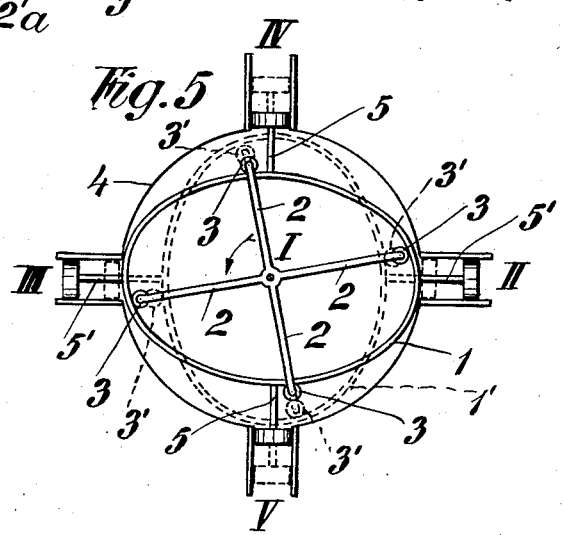
Figure 6:
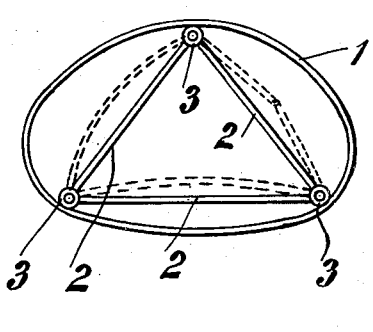

Fig. 1 shows this new machine-element in a simple form. The resilient hoop 1 is deformed to oval shape over the rolling parts 3 which are fixed and mutually distanced on a correspondingly dimensioned stay 2, which is here for instance rotatably mounted at M. In Fig. 2 two stays are in the position of the major and the minor axis of the ellipse. They may be interconnected or unconnected in the centre M. The rolling parts situated on the stay in the position of the major axis are mounted inside and those on the other stay outside the resilient hoop. In the Fig. 3 two cross-stays 2, 2' are unconnected in the centre M. The ends of these stays are interconnected by a ring-stay 2a, 2a' on which the parts 3 and 3' rolling on the single common ellipse 1 are adjustably mounted. When the two systems are connected by the common resilient ellipse I but unconnected at M, this arrangement represents an elastic resilient transmission of rotary movement and power into rotating movement and power; f. i. between two rotary shafts connected on both sides with M, M'. If the system M, 2, 2a, 3, I drives and thus deforms the resilient ellipse and thus changes its position in space, the rollers 3' of the other system M', 2', 2a', 3', I are compelled to follow the imaginary new position of the major axis of the ellipse and thus to rotate in the same sense with the same angular speed, but different circumferential speed. This arrangement allows also a reversal of transmission as M', 2', 2a', 3', I can be the driving system and in consequence the other system M, 2, 2a, 3, I connected with the common hoop I will be the driven system. The ends of the stays and the position of the rolling parts are here locally mutually independent. Power or motion can also be resiliently transmitted with various circumferential speeds. Fig. 5 shows a simple illustration of another use of this new constructional element as mediatory organ for converting rotary movement into reciprocating movement or reciprocating movement into rotary movement, between driving and driven parts of an engine or of a machine. The stays 2, 2, 2, 2, are here interconnected at M and form the major and the minor axes of the system rotating around a common centre. The stays carry on their ends rollers or cylinders rolling on the hoop's circumference and at the same time guide the hoop. Here f. i. this constructional element converts the reciprocating movement of the pistons II, III, IV, V into rotating movement around the axle or shaft at I. If f. i. a sudden and vehemently acting force for example the explosion of a charge acts on the pistons II and III, the resilient ellipse is deformed by the piston rods 5 and the rotary running system part I, 2, 3 is compelled to roll on the changing surface shape in the direction of the arrow, into the new position of the major axis of the ellipse approximately into the position shown in dotted lines, whereupon the pair of pistons IV and V act and so forth. The power and movement transmitting operation may also be in inverse direction. If again a suddenly occurring force, for example a gust of wind, acts in the direction of the arrow; f. i. on a shaft of a wind-wheel connected at I', the rollers 3 will roll on the resilient ellipse through the intermediary of the stays 2, and deform the ellipse f. i. up to the position I' and thus impart a reciprocating movement to II, III, IV, V which here represent for instance pumping parts or the movement of a saw, etc. The suddenly and vehemently acting force is with advantage transmitted more gently and softly and saves power by the resilient transmitting effect of this constructional element. A large portion of the excessive energies is accumulated without being lost for use. The constructional element acts here somewhat like a resilient connecting rod. The distribution of the forces and movements acting on the hoop can evidently be arranged in some other suitable manner. (As f. i. shown in Fig. 15.) Some of the stays may be also made slightly resilient, so that, under a heavy load they bulge in S shape towards the direction of movement, which would be favourable in all cases when an exact dead centre position has to be overcome in the case of forces acting from outside the ellipse (see Fig. 2, dotted lines). Windmotors or the like often come to a standstill. For restarting them and the machines and the like connected therewith a relatively great initial power is necessary to overcome the inertia. The use of this resilient constructional element, owing to its soft and gradual reengagement reduces the initial power necessary for restarting, so that the possibility of using such windwheels is better utilized. Fig. 4 represents a type with three stays joined at their ends. The resilient hoop is here guided over three rollers on a triangular frame formed by the stays. Fig. 6 is similar, yet the base is longer than the sides and is advantageous f. i. as constructive part of a vehicle as mediatory organ between a load and the ground, because the portion of the circumference of the ellipse bearing on the ground is thereby enlarged. Owing to the tension of the hoop the ellipse sits tightly in grooves in the rolling parts and it is not absolutely essential to fit counter wheels for preventing the hoop slipping out. The apex rollers may be situated inside and outside, or only inside or only outside, or their position may suitably deviate from the exact apex point.

Figure 7:
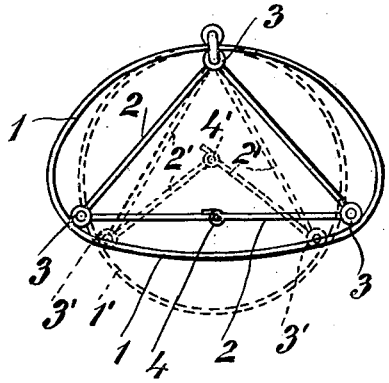

Fig. 9 illustrates how the constructional element may be fitted and used as constructional part of a vehicle without any ordinary vehicle wheels, and fulfill all exigencies necessary for locomotion such as steering, etc. and besides offering many new advantages. According to the invention, when a driving power is started up and transmitted by any possible and suitable means on to the rolling parts f. i. in the clockwise direction, the rollers, cylinders, wheels and the like 3, suitably arranged on supporting stays 2, in a resilient ellipse or oval I preferably bearing with a larger portion of its circumference on the track, tend to roll with the frame within the hoop but are lifted by the resilient hoop from the track and thereby continually displace the centre of gravity in the elementary system so that, by gravity acting on the running rollers, other portions of the circumference of the resilient hoop in front of these rollers in the direction of travel are pressed against the track and other corresponding portions of the hoop at the rear of the element rise by the overcoming spring force in this portion of the hoop; the action is therefore similar to that of a treadmill but in this instance however the forces act in a resilient ellipse with particularly great advantages. Consequently a progressive movement of the vehicle in the sense of forward travel is produced (see arrow in Fig. 9). If the main shafts transmitting the power to both elementary systems on each side are suitably connected to a driving engine or the like f. i. by gears in such a manner that each main shaft can be driven at a different speed and, if necessary, also in a different direction, the change of direction of travel can be obtained by accelerating or retarding or cutting out entirely the rollers of one elementary system relative to the other. In the latter instance and also when the two co-operating systems are driven in different direction, such a vehicle can be turned on the spot. For example a differential gear with arrangements for braking a main shaft may also be provided for effecting changes in the direction of travel. The driving power for the rolling parts of this constructional element as may be used in a vehicle, can be vital, elementary or motoric and situated within or without the vehicle. At least one of the supporting rollers of one constructional element lies with its axle lower than the major axis of the ellipse on which it rolls on the inner side. However a roller or wheel never bears directly on the ground but is always separated and lifted therefrom the hoop. For ensuring a good guiding of the hoop, it is preferable, to provide three or more rollers for a single hoop in each system, at least two of these rollers running with their axles under the position of the major axis, as low as possible in the system (but always lifted by the resilient hoop from the track) in order, by the low position of the centre of gravity, to obtain the greatest possible stability and to ensure the greatest and easiest possibility of running for the supporting rollers. The mutual possible position of the rollers on the stays may be fixed, or that of positions of single or several rollers can be arranged mutually variable. At the time the length of the portion of the hoop bearing on the track can also be automatically increased in the case of increasing load on the elementary system and automatically reduced in the case of decreasing loading. This may be effected for example by mutually moving the lower rollers of a system by the action of separate springs or the spring effect of the coordinate hoop (as shows f. i. Fig. 7). However by a suitable distribution of the stays and the coordinate rollers the length of the portion bearing on the track may be ensured and only slightly varied under different loads. For example bulged stays provided with joints or hinges or made of resilient material alter the degree of bulging under the action of the load acting on them, and therefore also the distance between the rolling parts on their ends and thus at the same time influence the resilient tension of the hoop. The connection and the construction of the particular component parts of the constructional element may evidently be also different from those shown in the drawings. The frame especially when employing more than three rolling parts, can be constructed in some other shape than the triangular here employed. Besides all usual purposes of locomotion it is possible with this new constructional element to construct such a type of a small and light vehicle for standing upon when driving, a sort of motor skates free from jolts or a motor ski without slipping. The elementary systems on both sides of the vehicle (see Fig. 9) may in this case also be placed close together between the feet of the driver, or they may contact or intersect in their mutual arrangement, f. i. at the apex. For the construction of a vehicle only one or several constructional elements may be employed; these cooperating side by side or one behind the other. The elementary systems need not be arranged in parallel planes; these can be also so arranged, that they are oscillatable, which may be of advantage for many steering purposes. All parts and necessities of such a vehicle can be arranged in only three planes (f. i. two constructional elements and the connecting platform), so that by using a suitable transmission of power on the rolling parts (f. i. by a bevel wheel gear), the vehicle can be easily folded or dismantled for the purpose of storing or the like. This new kind of locomotion using this new machine-element in a vehicle as mediatory organ between a load and a track, enables, a reduction of frictional resistance and slipping and consequently a saving in power to be obtained besides protecting the parts of such a vehicle against jolts and vibrations so that they can be made lighter and constructed with less material. The rolling parts of the constructional element are here so distributed, that the resilient hoop-part always bears with a relatively large portion of its circumference flat on the track and therefore a constructional element of relatively small dimensions has already the same effect on the ground as a much larger and therefore much heavier ordinary vehicle wheel. It is possible to travel on a vehicle fitted with these machine-elements not only over irregular ground or uneven paving, but also over railway sleepers, steps and the like and without being subjected to jolts owing to the resilient bridge between the lower rolling parts of the element. Separate shock absorbers requiring much space are here unnecessary. This new kind of locomotion ensures also reliable travelling even on ice or snow covered ground or sandy soil without slipping or sinking in and also on gradients. Losses of power and excessive wear of the hoop by friction and slipping are here considerably reduced primarily by employing the resistant steel.

Figure 8A:
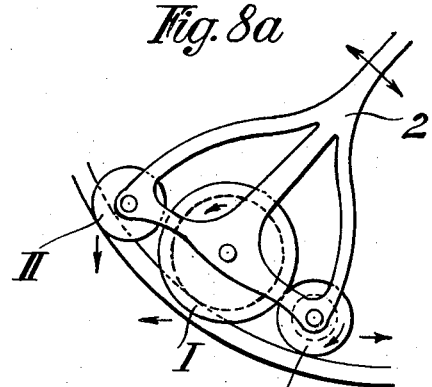
Figure 8B:
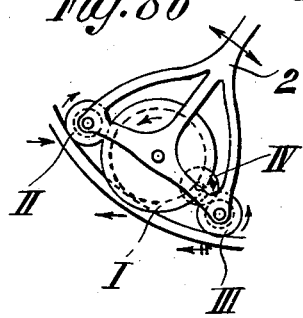
Figure 8C:
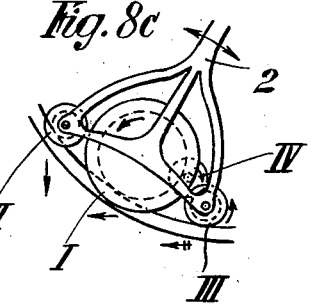

The employment of this constructional element enables a further possibility of steering by varying the roller-part of the elementary system. In Figs. 8a to 8c auxiliary wheels II and III are arranged in front of and behind the main running wheel I. These auxiliary wheels are pressed alternately against the resilient ellipse f. i. by lever effect, and the main running wheel is thereby slightly raised and disengaged from the hoop. One of these auxiliary wheels runs f. i. idle, and the other can be differently coupled with the main running wheel. In Fig. 8a for example the front auxiliary wheel II runs continually idle on the circumference of the hoop. If the lever 2 is pressed forward, the main running wheel I, driven by an engine or the like, is disengaged from the surface of the ellipse so that it no longer runs on the circumference of this ellipse. When the roller-parts in the other system continue to run the direction of travel will necessarily change. The roller parts of the systems on the two sides may be driven by one single continuous shaft from a motor, a one-sided alteration of the running speed for changing the direction of travel being nevertheless possible.

In the Fig. 8a the rear auxiliary wheel III is directly coupled with the main wheel and consequently rotates in the opposite direction. If it is brought by lever pressure into contact with the ellipse and the main wheel is lifted, a rearward travel will result.

In Fig. 8c a front wheel is constantly idle running whereas the rear wheel is coupled with the main wheel I not directly but through the intermediary of the wheel IV. The wheel III pressed against the ellipse by the pressure of the lever will for example cause a moderate forward travel.

Another variation is illustrated in Fig. 8b. In this instance the auxiliary wheels are arranged so that, when they are engaged, the front wheel effects a reverse, and the rear wheel a forward movement of moderate speed. In this instance the main driving shafts must be separately coupled to the motor on both sides of it. The parts can evidently differ from the drawings as regards their arrangement and number.

When employing this new machine-element for an aeroplane (Fig. 7) the stays of the frame do not permanently hold the resilient hoop in elliptical shape, but parts of the stays of this elementary system are movable (for example, joints in the lower stay at 4 and 4') or resiliently flexible, so that by changing the mutual distance of the roller parts, they enable a deformation of the resilient hoop between oval and circular shape: according to whether the hoop is under load, or unloaded: so that during starting or landing of the aeroplane the full resilient force of the hoop can be utilized to good advantage (Fig. 7, parts I and I'). The hoop in the position illustrated in dotted lines, is unloaded and the two parts of the lower stay (2', 2') are connected by an upwardly collapsible joint. As the pressure of the landing aeroplane increases, the two parts of the base come gradually into the stretched position shown in full lines, whereby the favourable oval shape with the greater length of the bearing circumference of the hoop is obtained and in case of landing on unfavourable ground the dangerous sinking in is prevented. The rollers roll on the hoop for example by the tractive power of the propeller or they may be driven in a different manner and separately. The apex rollers may be here suitably arranged only outside or outside and inside the hoop and their position may also deviate from the exact apex. Joints may also be arranged at any other point of a stay, or the stays may be of resilient bulging out construction. The pressure effecting the widening of the base may also engage on other movable parts besides the apex rollers and point and it is not necessary that the two arms with their lower ends are placed exactly at the ends of the base, but they can also be situated permanently or variably slightly towards the middle of the base. The flexible or the hingedly connected stays may be provided with pins sliding in one or several guide-slots according to number and position of the joints or bulging out parts. These guide-slots may be straight or curved, and arranged in any suitable position according to the common centre of gravity and the landing position of the aeroplane in order to obtain a favorable spreading movement of the stays when landing.

The Fig. 10 illustrates how several machine-elements can be employed arranged in the same plane one after another, f. i. in a resilient gear or bearing. They act here as intermediary organ for example between three concentrically arranged rotatable parts. The centre part A, an intermediate part B on which the elementary systems are situated, and an outside part C. According to the purpose, each of these three parts can be the driving, or the driven part or one of them can be relatively immovable. All possible variations of the constructional element can also here be used. For example the element $a$ may be very elastic and resilient, $b$ on the contrary hard on both sides, $c$ for instance is medium hard on both sides and $d$ partially hard and soft. So as the type also the number of employed systems can be various. This use of the constructional element has besides others also the advantages to make the gear or the bearing indifferent to vibrations and some displacement of rotating in its shaft, but it also reliably protects all neighbouring parts from all unfavourable influences.

Fig. 11 shows how the properties of this machine-element enable, in contrast to an ordinary wheel, the engagement and disengagement of different driving or driven elements or means, not only by movement in radial direction, but also by movement in tangential direction (i. e. around the centre.) The gearing is slow and soft, has a large surface of contact and is noiseless (see Fig. 11a). This type of the elementary system, as here f. i. is used, has a resilient hoop of oval or elliptic shape, supported by rollers on a suitable frame. (Also another type, f. i. that of Fig. 1 can be used for it). This machine-element is displaceable not only in the direction of the two main axes of the ellipse but also around the centre. The movement around the centre for example in clockwise direction engages f. i. the wheels a—d, A—D, or in contrary direction the wheels b—c, B—C, displaced in the direction of the minor axis upwards a—b, A—B, downwards c—d, C—D, in the direction of the major axis to left a—c, A—C, or to the right side b—d, B—D; thus in this arrangement there are six possible combinations, whereby f. i. the wheels A—B—C—D may be supposed as driving wheels. The arrangement, the number and distribution in driving and driven wheels may vary. A complete simultaneous disengagement of the wheels and the constructional element is possible. External means lying in or outside the hoop can be coupled and uncoupled in such a manner, that the shape or position of the hoop is variable over movable stays to correspond to any actual purpose, f. i. by hingedly connected or resiliently bulging out stays, movable either in, as well as out of the plane of the hoop. (See Figs. 11b, c, 12a, 13 for example).

Fig. 12 is a further example of an arrangement of two such constructional elements in the same plane, and shows how the properties of this new machine-element make it possible to engage and disengage, in another way, external means. In this instance two such machine-elements are so arranged, that the hoops belonging to them are situated concentric one within the other, so that rotating round a common centre on a circular path the two concentric hoops are passing, gliding by together, but being brought by the expanding ends of stays and the rollers into oval, elliptic or other non-circular shape the hoops are joined together rotating around the common centre so that means (shafts, etc.) joined together by the constructional element are brought into operative connection. Amongst the many possible examples of use the variable line space mechanism of a typewriter may be chosen for the purpose of explanation. If the shaft M carries the platen cylinder and the part N is free rotatable round the shaft M and carries the toothed wheel for the line-spacer of the typewriter, the platen can be turned freely and brought into any position, when the two hoops are in circular shape platen is fully rotated, as the rubber platen cylinder fixed on the shaft M is not connected by the concentric gliding hoops with the toothed wheel on N for spacing the lines; when the hoops are deformed for example into oval shape the parts M and N come into operative connection and the line spacing mechanism is automatically engaged with the platen cylinder in any position. The part N has four or more holes or radial slots 4 in which pins, rollers and the like 3b engage, over which the resilient hoop 1b joined with the part N—2b is arranged the latter part being freely rotatable around the shaft M. Thus the hoop 1b can move only in radial direction (towards and from the centre), but not in tangential direction. The inner concentric hoop 1a bears against the rolling parts 3a arranged on stays 2a joined with the shaft M. The resiliently or hingedly connected bulging out stays (2a) serve to distort the circular hoop into a shape different from the circular being guided in a more or less straight line by which the mutual distance between the ends of the stays is changed. (Fig. 12a). In the Fig. 12 the bulging out parts of the stays move out of the hoop plane and are joined with the shaft M in such an angular manner that they can perform an axial reciprocating movement (see f. i. the shiftable part 5 on the quadrangular part of the shaft), but when rotating around the axis of rotation the movable stays remain positionally joined with the rotary shaft M. In the case where the stays are arranged movable only in the plane of the hoops, the bulging out parts of the stays may be guided by pins gliding in slots or the like, which are situated in the plane of the hoop and in a part fixed on the shaft M as for example in Fig. 11b. The parts 3a guiding the hoop may have different diameters according to the degree of hardness of engagement desired for; of course the resiliency of engaging is also dependent upon the thickness and the deformation of the hoop. In some cases of use of this machine-element the axles of rollers may be fixed on one, for instance the inner hoop and these rollers also guide the outer hoop in case of need by their flanges or the like. (Fig. 12b, part 3a—1b). This machine-element, on account of its new properties acts with similar function and effect also in other and more simple relations to other means. To attain a similar effect it is also possible to use two such systems with a single common hoop.

Figs. 1 and 13 show for example this machine-element rotatable around a fixed centre, and Fig. 14 represents the rotating position with a stationary fixed point on the circumference of its hoop-part; both are suitable for various technical purposes. In Figs. 1 and 13 (if the distance between the ends of the stays is constant) the operative lift and also the change of position in all directions of the plane are equal to the half difference between the major and minor axes of the ellipse—in Fig. 14 the hoop of the rotating system rigidly or hingedly fixed to a relatively unmovable means at a point of its circumference. This results in new forms of movement; the centre and the ends of stays move in a path deviating from the circular. This path may be composed of oval, elliptic, straight, stationary and reversible sections. In Fig. 14a, for example, a designates the path of the middle axle M, b that of the ends of the minor axis and c that of the major axis. The arrangement of the rolling parts can likewise be other than shown in this example. Using in the rotary systems stays the distance between the ends of which is variable, an optimal height of operative lift can easily be adjusted when required. Also by a temporary or rhythmical influence on the stays of the rotating system, various more complicated forms of operative lift can be obtained, with the aid of alternately variable distance of the ends of stays from the centre of rotation.

By means of this constructional element it is not only possible to transform rotating power and motion into reciprocating power and motion or inversely by acting in the plane of the hoop see Fig. 5, but its use enables such motions to be transmitted in all other directions, for instance perpendicular to the hoop's plane (see Fig. 15 which shows an elevation taken at 45° relatively to the plane of the hoop Fig. 1.) If to the form of construction shown in Fig. 1 two stays are hingedly connected at two opposite points A and B to the outside of the circumference of the resilient ellipse, and the other ends of these stays are interconnected in the same manner at P, (C—D—P' show similar connections on the other side of the system but in another position) and if the frame of the stays with the rolling parts are rotating in the resilient hoop, then the points P, P' will move to and fro relatively to the centre M of the elementary system according to the changing position of the hoop (the stay lying in the major axis of the ellipse comes in the position A—B, and so on). If a third stay C—P², is hingedly journalled to P, the plane A—B—P² is under the same conditions (stay with rollers rotating around M) and obliged to go up and down varying its shape accordingly, the base being shortened and lengthened. Resiliently flexible stays may also be used in this case instead of rigid ones. Various combinations of the acting stays or frames on the two sides of the constructional element may be used. If they are for instance, on the ellipse mutually displaced through an angle of 180°, their action will be relatively contrary or compensatory according to the operative engagement.

This new machine-element is capable of influencing by help of its new properties the motion or path of various means in different useful manner, or inversely can be influenced by other means. Its use in high-grade constructions (f. i. gears, machines, apparatus, etc.) combines with advantage the properties of toothed wheels and frictional wheels, making possible a broad superficies and noiseless operative engagement without the necessity of great axial pressure in the frictional wheel gears and without the noisy engagement and great wear of toothed wheel gears.

It will be understood, that the accompanying drawings and the foregoing description are given by way of example and purely illustrative and by no means exhaustive and not intended to be limiting; many other uses, alternations and modifications in arrangement, combination, and the like of this general machine-element may be made without departing from the structural law and the spirit and the scope of the invention set forth in this specification.

I claim:

1. A universal machine-element of the technical character of a universal transmission element as described and in the form of an individual system comprising in combination three essential component parts: a hoop-part, a stay-part, a roller-part, the resilient hoop adapted to be bent in operative connection with means situated on its circumference, at least two inside rollers bearing against and rolling along on said hoop, said rollers adapted to move their axial position relatively to the hoop's circumference to deform said hoop during the relative rotation and locomotion, and so in consequence also fit for locomotion of the axial position accordingly to the changing hoop's shape, the said rollers being situated between said hoop and at least one stay, said stay adapted and arranged to maintain said rollers in a suitable distance apart, the ends of said stays being fit to move relatively to the hoop in circumferential direction and to and from the hoop's circumference, the component parts of this elementary system, said hoop and said rollers and said stays being relatively to each other in mutual movable and rotatable relationship to effect a transmission of movement and power between various possible external means and parts operatively interconnected by the said structural law of this described universal machine-element, whereby the lower part of the said resilient hoop when in contact with a ground is according to the structural law of this invention intentionally and necessary fit and adapted to be remarkably flattened and together at least two rollers of the system are situated lower than the greatest diameter of the hoop and necessary rolling along in one direction on the inside of the said flattened and free resilient hoop being effective without the co-existence of a bicycle or an ordinary vehicle wheel.

2. A universal machine-element as specified in claim 1, in which the stay-part consists of a stay extending through the centre of said hoop and is in relative rotatable and movable relationship thereto, and two rollers one on each end of said stay are bearing against and rolling on the circumference of said hoop being adapted to deform said hoop during the relative locomotion of the ends of said stay.

3. A universal machine-element as specified in claim 1, in which are at least two stays intersecting at the centre of said hoop having the ends in relative rotatable and movable relationship relatively to said hoop and rollers mounted one on each end of each of said stays.

4. A universal machine-element as specified in claim 1, in which the ends of the stays intersecting at the middle of said hoop are interconnected by other stays, on which the said rollers are mounted with variable adjustable mutual distance.

5. A universal machine-element as specified in claim 1, in which more than two stays are interconnected at their ends being in rotatable and movable relationship relatively to said hoop and having rollers mounted one at each point of connection between two of said stays.

6. A universal machine-element as specified in claim 1, in which is at least one oscillatable stay, a plurality of rollers rotatably mounted on the end of said stay and adapted to be selectively brought to bear against and to run along on said hoop.

7. A universal machine-element as specified in claim 1, in which at least one stay is arranged diametrically through the centre of said hoop and in rotatable relationship to said hoop around the said centre and two rollers one on each end of said stay bearing against and rolling along on the inner side of said hoop.

8. A universal machine-element as claimed in claim 1, in which are at least two stays in rotatable relationship to said hoop, and two rollers mounted at the one end of at least one of said stays, one of said rollers rolling off on the outer side and the other on the inner side of said hoop.

9. A universal machine-element as specified in claim 1, in which are two stays intersecting at right angles at the centre of said hoop, rollers mounted one at each end of each stay, the rollers on the one stay bearing against and running away on the inner side of the said hoop and those of the other stay bearing against and rolling off on the outer side thereof.

10. A universal machine-element as specified in claim 1, in which at least one stay is adapted and fit to variate the mutual distance of the two ends of it to maintain the said rollers in a suitable distance apart and at least two rollers one mounted on each end of said stay maintained in a variable mutual distance apart to allow the resilient hoop to assume a variable shape.

11. A universal machine-element as specified in claim 1, in which at least one stay is composed of hingedly connected sections adapted to fold, to allow said resilient hoop to assume a variable shape and rollers are mounted on each end of said stay and running along on said hoop.

12. A universal machine element as specified in claim 1, in which at least one stay is flexible and adapted to be bent to allow said resilient hoop to assume a variable shape, rollers mounted on said stay and running along on said hoop bearing against it.

13. A universal machine-element as specified in claim 1, in which the stays are connected at their ends maintaining the rollers mounted on these ends in a position different from that of the greatest diameter of the hoop when in elliptic shape, said stays being in connection with a load are transported by the said rollers moving along on the hoop's circumference which is essentially flattened on the portion bearing on a track on which parts of the circumference are alternately pressed by the pressure and the forward movement of the said rollers and stays which are moving off in one direction in the said hoop.

14. A universal machine-element as specified in claim 1, in which at least one of the essential component parts is operatively connected with driving or driven external means.

15. A universal machine-element as specified in claim 1, in which at least one of the essential component parts is operatively connected with rotatable or rotating external means.

16. A universal machine-element as specified in claim 1, in which at least one of the essential component parts is operatively connected with reciprocating external means.

17. A universal machine-element as specified in claim 1, in which at least one of the essential component parts is operatively connected with moved or movable external means.

18. A universal machine-element as specified in claim 1, in which at least one of the essential component parts is operatively connected with relatively stationary means.

19. A universal machine-element as specified in claim 1, in which at least one of the essential component parts is operatively alternately engaged and disengaged with external means.

20. A universal machine-element as specified in claim 1, in which at least one of the essential component parts is the directly operatively connective member for two or more said machine-elements.

21. A universal machine-element as specified in claim 1, in which at least one of the essential component parts is operatively connected by external mechanical means with parts of other said machine-elements which are mutually arranged in relative positions in the same plane or in relatively different planes.

ANTONÍN JAN ZÁRUBA.